(12) United States Patent
Jelinek et al.

(10) Patent No.: US 6,581,830 B1
(45) Date of Patent: Jun. 24, 2003

(54) CARD READER WITH MULTIPLE CHIP CARDS SLOT OPENING

(75) Inventors: Egbert Jelinek, Sarstedt (DE); Stefan Goss, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/202,589

(22) PCT Filed: Jun. 12, 1997

(86) PCT No.: PCT/DE97/01184

§ 371 (c)(1),
(2), (4) Date: Jan. 10, 2000

(87) PCT Pub. No.: WO97/49058

PCT Pub. Date: Dec. 24, 1997

(30) Foreign Application Priority Data

Jun. 17, 1996  (DE) .......................................... 196 24 079

(51) Int. Cl.[7] .............................................. G06K 7/06
(52) U.S. Cl. ...................... 235/441; 235/492; 235/486; 235/439; 235/440
(58) Field of Search ................................ 235/379, 380, 235/382, 492, 440, 486, 439, 441

(56) References Cited

U.S. PATENT DOCUMENTS

| | | | | |
|---|---|---|---|---|
| 4,709,136 A | * | 11/1987 | Watanabe | 235/379 |
| 4,975,805 A | * | 12/1990 | Schmutzler | 361/399 |
| 5,093,862 A | * | 3/1992 | Scwartz | 235/382 |
| 5,434,395 A | * | 7/1995 | Storck et al. | 235/380 |
| 5,470,259 A | * | 11/1995 | Kaufman et al. | 439/607 |
| 5,478,260 A | * | 12/1995 | Kaufman et al. | 439/609 |
| 5,679,007 A | * | 10/1997 | Potdevin et al. | 439/76.1 |
| 5,929,427 A | * | 7/1999 | Harada et al. | 235/492 |
| 5,949,048 A | * | 9/1999 | Nakamura et al. | 235/439 |
| 6,010,066 A | * | 1/2000 | Itou et al. | 235/379 |
| 6,027,365 A | * | 2/2000 | Kaufman | 439/489 |
| 6,097,605 A | * | 8/2000 | Klatt et al. | 361/737 |
| 6,137,710 A | * | 10/2000 | Iwasaki et al. | 235/380 |
| 6,189,786 B1 | * | 2/2001 | Itou et al. | 235/379 |

FOREIGN PATENT DOCUMENTS

| | | | |
|---|---|---|---|
| JP | 06020106 A | * | 1/1994 |
| JP | 09050497 A | * | 2/1997 |

* cited by examiner

*Primary Examiner*—Thien M. Le
*Assistant Examiner*—Uyen-Chau Le
(74) *Attorney, Agent, or Firm*—Kenyon & Kenyon (57) ABSTRACT

A card reader for chip cards, which have contacts on a front face for reading and entering card information, with a card slot for receiving chip cards via an opening with a first contact arrangement mounted in the card slot for contacting the contacts of an inserted chip card and a first switching arrangement that responds to the presence or absence of chip cards in the card slot and a second contact arrangement opposite the first contact arrangement for contacting a second inserted chip card.

12 Claims, 9 Drawing Sheets

CARD READER WITH MULTIPLE CHIP CARDS SLOT OPENING

FIELD OF THE INVENTION

The present invention relates to a card reader for chip cards.

BACKGROUND INFORMATION

Plastic cards have been used for some time for the electronic management of service systems such as security systems, stationary and mobile telephone services, banking, and health care; these plastic cards (known as chip cards) are provided with a microchip containing modifiable and permanent data. Access authorization and/or allowability of the requested transaction is electronically verified at the time of each access request using the stored data. For this purpose, the chip card is positioned in a card reader so that the microchip contacts arranged on the surface of the chip card establish an electrically conductive connection in the card reader, making data exchange possible.

German Patent No. 195 01 620 and German Patent Application No. 195 01 641 describe card readers for chip cards, in which, however, only one chip card can be introduced at a time.

SUMMARY OF THE INVENTION

A card reader for chip cards according to the present invention has the advantage over conventional card readers in that two chip cards may be introduced simultaneously in the card slot. This results in reduced space requirements and lower costs as compared to two separate card readers, for example, which would otherwise be needed for machines combining two functions that are supported by separate chip cards. If the card reader is used for a single chip card, the chip card can be introduced either with its front face up or with its front face down in the card slot of the card reader. This provides additional operating convenience of the card reader according to the present invention.

Advantageous refinements of and improvements on the card reader according to the present invention are possible. A particularly compact embodiment of the card reader results from the fact that when two chip cards are inserted, the back faces of the two chip cards lie flat against one another. Thus the contacts arranged on the front faces of the chip cards may be contacted for reading and/or entering card information in a minimum of space using two contact arrangements.

A second switching arrangement responding to the presence or absence of a second chip card offers the possibility to introduce two chip cards in the card slot at different times.

A press plate provides a simple means for guiding the first chip card inserted to the first switching arrangement. Thus it is ensured, in a simple manner, that a second chip card inserted at a later time only activates the second switching arrangement and thus its presence in the card slot may be unambiguously detected. A cost-effective embodiment of this press plate has only one additional press spring and a rotatable support of this press plate.

In a basic embodiment, the press plate has recesses leaving space for a rigidly attached second contact arrangement. Another advantageous improvement is represented by the attachment of the second contact arrangement directly on the press plate. In this manner, when only one chip card is inserted, it makes no difference whether it is positioned front face up or front face down.

By connecting the contact or switching arrangements with a computer, chip cards that have been introduced may be read, their function can be verified, and data can also be written on them. The switching arrangements report the presence of the card to a computer and may, for example, initiate an application.

Another advantageous use of a computer is represented by the automatic determination of the contact arrangement to which the chip card that has been introduced is electrically connected. The advantage of the compactness of one card reader for two chip cards becomes particularly evident when it is integrated into a car radio. A car telephone function and the reading of information for calling a traffic message channel may be elegantly combined.

In an additional application, the transmission of information from the first contact arrangement to the second one or vice-versa is also conceivable, for example, electronic transfer of funds or the like with minimum space required.

An ejection mechanism that is provided simplifies the removal of a chip card that has been inserted. In particular, when a second ejection mechanism is available, two chip cards that have been inserted may be removed or only a single chip card may be removed.

BRIEF DESCRIPTION OF THE DRAWINGS

FIG. 4b shows a side view of two chip cards positioned to be inserted in the card slot shown in FIG. 4a.

FIG. 6a shows the card reader schematically shown in FIG. 3 without chip cards inserted into the card reader.

FIG. 6b shows two chip cards inserted into the card reader shown in FIG. 6a.

FIG. 6c shows one chip card inserted into the card reader shown in FIG. 6a.

FIG. 8a shows a third embodiment of a card reader according to the present invention.

FIG. 8b shows a first lateral view of the card reader shown in FIG. 8a.

FIG. 8c shows a second lateral view of the card reader shown in FIG. 8a.

DETAILED DESCRIPTION

Figure 1:
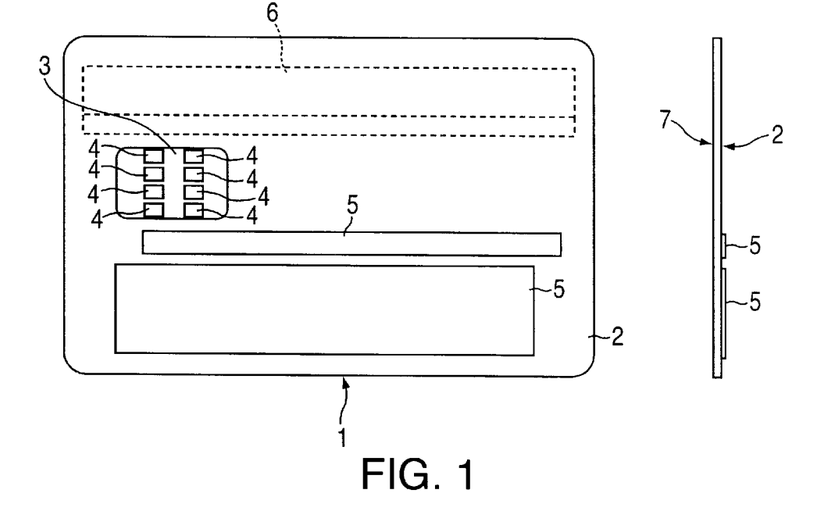
FIG. 1 shows a chip card designed according to international standards.

FIG. 1 shows a chip card 1 with a front face 2 and a back face 7. Front face 2 contains raised-letter text fields 5. A microchip 3, which may be electrically contacted via contacts 4, is also located on the front face. Magnetic strips may be located on back face 7, which is flat. Thus, back faces 7 of two chip cards 1 may be placed flat against one another. The figure is based on the ISO standards; however, in general, any chip card that has electric contacts on its front face and whose back face has a flat surface may be used for the card reader according to the present invention.

Figure 2:
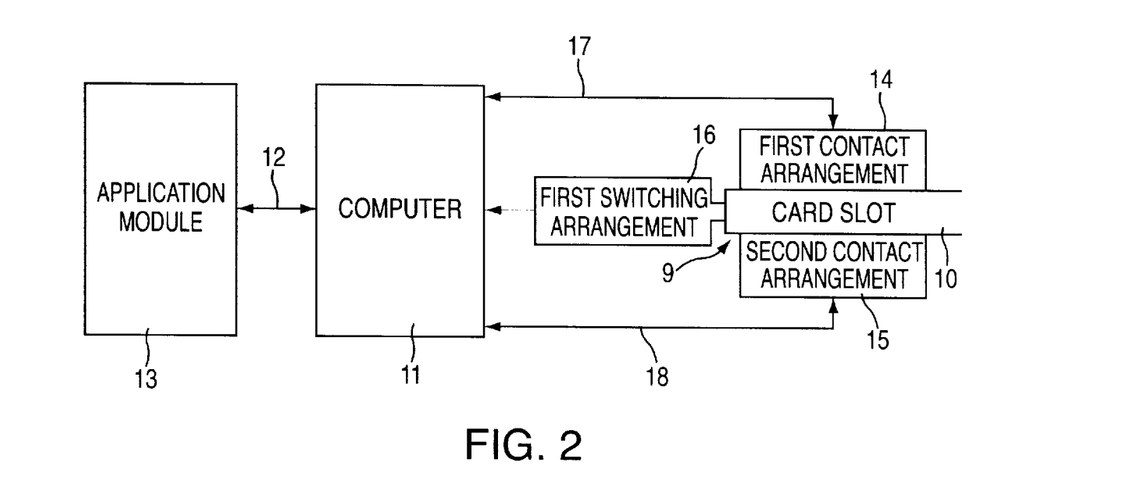
FIG. 2 shows a schematic of a first embodiment of a card reader according to the present invention.

FIG. 2 schematically shows one embodiment of card reader 9 according to the present invention. A first contact arrangement 14 and a second contact arrangement 15 are mounted on card slot 10. The card reader is capable of independently interacting with two chip cards described in FIG. 1 that have been inserted in the card slot using these contact arrangements. A first switching arrangement 16 registers the presence or absence of chip cards. Contact arrangements 14 and 15 and first switching arrangement 16 are connected, via first data link 17, a second data link 18, and a first switch line 19, to computer 11. Computer 11 is connected to an application module 13 such as a car telephone unit or a traffic message channel (TMC) decoder via control and receiving lines 12. After switching arrangement 16 has been actuated, computer 11 registers whether the front face of the chip card faces up or down. It initiates data exchange with the chip card inserted, via first data link 17 or second data link 18, accordingly. Applications are activated/deactivated or control instructions, stored on the chip card, are issued to the application module via control and receiving lines 12. Conversely, data can also be written on the chip card. For example, application 13 yields information to be stored, which then can be stored on the chip card via the appropriate contact arrangement.

Application module 13 may also include two applications that are activatable and controllable with two chip cards inserted in card slot 10 at the same time.

Figure 3:
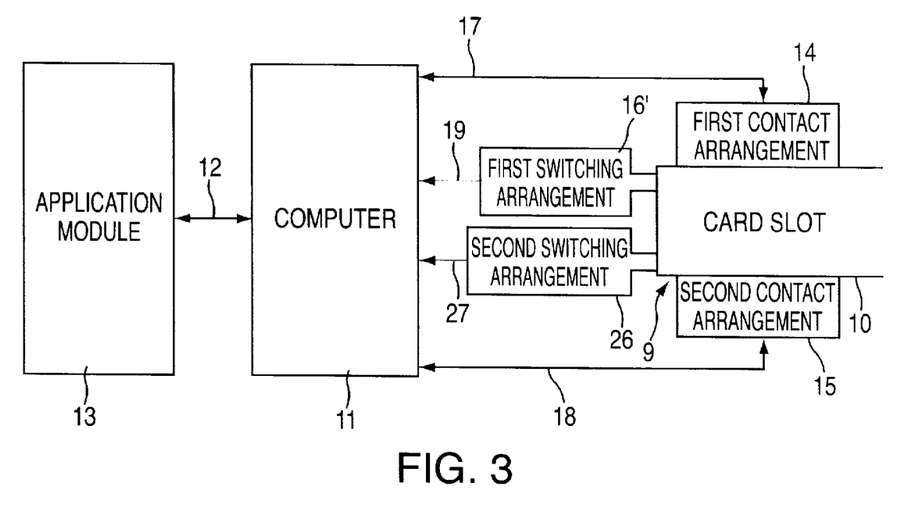
FIG. 3 shows a schematic of a second embodiment of a card reader according to the present invention.

FIG. 3 schematically shows another embodiment. The difference with respect to FIG. 2 is that in addition to a first switching arrangement 16', there is a second switching arrangement 26 in card slot 10, which is connected to computer 11 via a second switch line 27. In this embodiment, a means is provided through which the first switching arrangement, but not the second one, is actuatable as the first card is inserted. Thus, two chip cards that are inserted sequentially in slot 10 are registered by computer 11, the respective data links 17 and 18 are activated, and communication with application module 13, is initiated via control and receiving line 12. The means with which the chip card first introduced is guided to the first switching arrangement may be designed in the form of a press plate, for example, as described in more detail below in FIGS. 6 and 7.

Figure 4A:
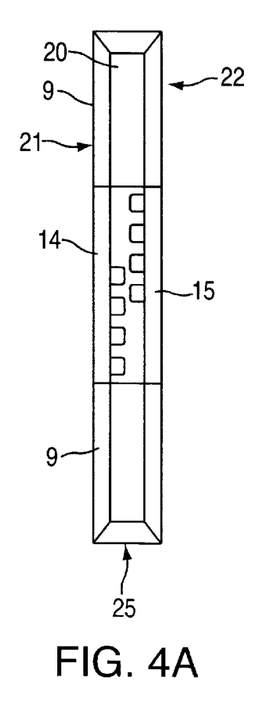
FIG. 4a shows a view through a card slot of the card readers schematically shown in FIGS. 2 and 3.
Figure 4B:
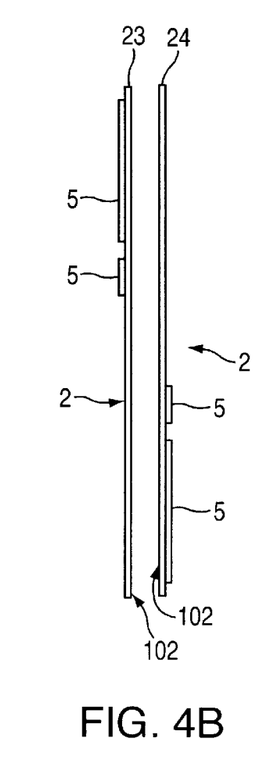

FIG. 4a shows a view through an opening of card slot 10 of card reader 9 schematically illustrated in FIGS. 2 and 3. Card slot 10 has a first side 21, a second side 22, a narrow side 25, and a rear wall 20. First contact arrangement 14 is mounted on first side 21; second contact arrangement 15 is mounted on second side 22. FIG. 4b illustrates the side view of a first chip card 23 and a second chip card 24 in the position as they are insertable in the card slot according to FIG. 4a with their back faces 102 placed flat against one another. The microchips mounted on front faces 2 with their contacts 4 (not shown) face the respective contact arrangements 14 and 15. Card slot 10 has sufficient space to accommodate raised-letter text fields 5.

Figure 5:
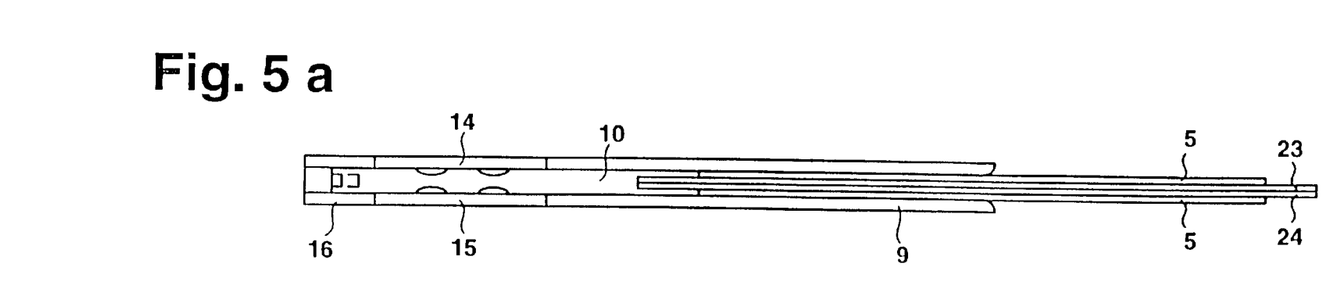
FIG. 5a shows two chip cards being inserted into the card reader schematically shown in FIG. 2.
FIG. 5b shows two chip cards inserted into the card reader schematically shown in FIG. 2.
FIG. 5c shows one chip card inserted into the card reader schematically shown in FIG. 2 and coupled via a first arrangement to a computer.
FIG. 5d shows one chip card inserted into the card reader schematically shown in FIG. 2 and coupled via a second arrangement to a computer.

FIGS. 5a–5d card reader 9 according to FIG. 2 in different operating states. FIG. 5a shows card reader 9 with two chip cards 23, 24 being inserted. Contact arrangements 14 and 15 are still free; switching arrangement 16 has not yet been actuated. FIG. 5b shows the card reader with chip cards inserted. Switching arrangement 16 has been actuated, and the computer has registered the presence of chip cards; data exchange is taking place between computer 11 and chip cards 23 and 24 via contact arrangements 14 and 15, respectively. FIG. 5c shows card reader 9 with one chip card inserted, which has been coupled via contact arrangement 14; FIG. 5d shows, in an analogous manner, the card reader with one chip card inserted, which has been coupled via contact arrangement 15. In each case, computer 11 checks, after switching arrangement 16 has been actuated, which contact arrangement is connected to the contacts of a chip card. Then the computer allows the above-described data exchange to take place via the respective contact arrangements.

When, in the case of FIG. 5c or FIG. 5d, a second chip card is subsequently introduced, the presence of this second chip card is not registered by computer 11, since only first switching arrangement 16 is present; i.e., in this case the first card must be removed and then both chip cards must be inserted together for the computer to recognize that data may be exchanged via both contact arrangements 14 and 15.

Figure 6:
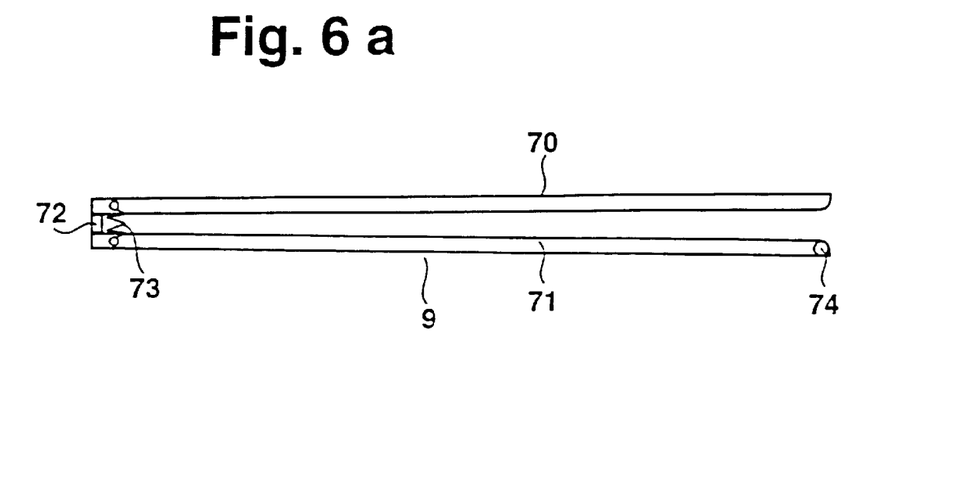

FIGS. 6a–6b show the positions of press plate 71 in the different operating states of the card reader schematically shown in FIG. 3, without contact or switching arrangements. FIG. 6a shows card reader 9 without chip cards; FIG. 6b shows the card reader with two chip cards 23, 24 inserted, and FIG. 6c shows the card reader with one chip card 23 inserted.

Figure 7:
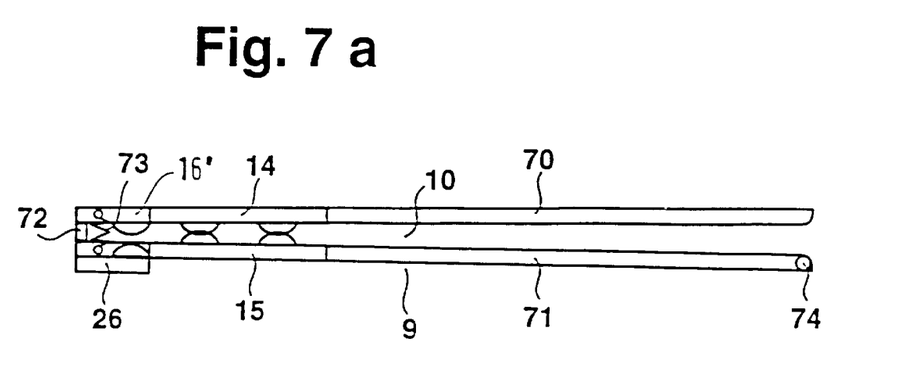
FIG. 7a shows a position of a press plate of the card reader schematically shown in FIG. 3 with one chip card inserted into the card reader.
FIG. 7b shows the position of the press plate shown in FIG. 7a with two chip cards inserted into the card reader.
FIG. 7c shows the position of the press plate shown in FIG. 7b with one chip card inserted into the card reader.

FIGS. 7a–7c show an embodiment of card reader 9 as schematically illustrated in FIG. 3 with contact and switching arrangements. Due to the presence of first switching arrangement 16' and second switching arrangement 26, the subsequent insertion of second card 24 is detected even if first card 23 has already been inserted. Therefore, if a second chip card is to be inserted, it is no longer necessary to first remove the first chip card from card slot 10. Furthermore, computer 11 detects whether chip cards 23 and 24 have been inserted correctly. If they have been inserted correctly, it can interact with the microchips 3 of the chip cards via contact arrangements 14 and 15. The card slot has a holding plate 70 and a press plate 71. Press plate 71 is rotatably mounted in a support 74. If card slot 10 is empty, a traction spring 73 presses press plate 71 onto a spacer 72. In the embodiment described in FIGS. 7a–7c, second contact arrangement 15 is rigidly connected to press plate 71, i.e., it moves with the press plate if a chip card is inserted in the card slot. FIG. 7a shows the position of press plate 71 when card slot 10 is empty. If two chip cards are inserted in the card slot, traction spring 73 is expanded to a maximum and press plate 71 is parallel to holding plate 70 (FIG. 7b). If only one card is inserted initially, press plate 71 presses chip card 23 in the direction of holding plate 70, whereby only first switching arrangement 16' is actuated (FIG. 7c) when chip card 23 is introduced to a sufficient depth in card slot 10. Computer 11 detects via which contact arrangement it may communicate with the chip card. If a second chip card 24 is subsequently inserted in the card slot, second switching arrangement 26 is also actuated and the computer triggers interaction also with the second chip card. Depending on the position of the front face of the first chip card introduced, the second chip card must, of course, be inserted either between the holding plate and the first chip card introduced or between the first chip card introduced and the press plate. In this case as well, the computer detects whether the second chip card was introduced in the correct position after the second switching arrangement has been actuated. Switching arrangements 16' and 26 of FIGS. 7a–7c do not move jointly with the press plate. They are rigidly connected to card slot 10. Press plate 71 therefore has recesses (not shown), which leave room for switching arrangement 26 to be actuated by the inserted chip cards. As an alternative, contact arrangement 15 can be rigidly connected to card slot 10. In this case, press plate 71 has additional recesses, which are also not shown. These additional recesses are used to provide electric contact between contact arrangement 15 and an inserted chip card. In this case, however, the first chip card must be inserted so that its front face is oriented toward holding plate 70; otherwise it cannot be electrically contacted. As an alternative, other placements of press plate 71 that are different from that of placement 74 of FIGS. 6a–6c and 7a–7c are also conceivable. The essential thing is that, when a first chip card is inserted in the card slot, the press plate causes only one of switching arrangements 16' or 26 to be actuated as defined.

Chip cards carry a machine-readable ID code. when the computer reads this ID code, it is capable of providing the service supported by this card. This procedure has the advantage for the card reader according to the present invention that it does not matter which card assumes which position in the card reader. It is also independent of whether the card reader has only one switching arrangement or two switching arrangements.

Figure 8:
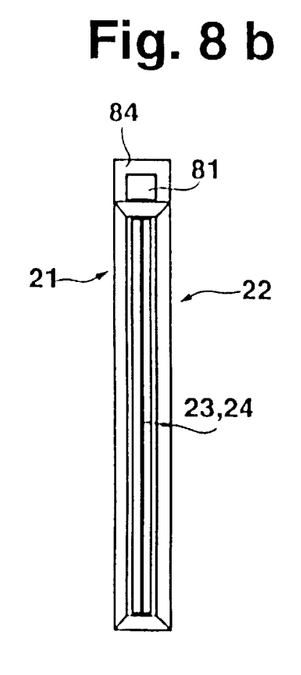

FIGS. 8a–8c show a third embodiment of a card reader according to the present invention with a card slot 10 and an ejection mechanism 84 mounted on the slot. Ejection mechanism 84 has a first ejection bar 81, which is rotatably connected to a first lever 86 via first bar assembly mount 82. First lever 86 is rotatably mounted via second bar assembly mount 83 and has a first ejection pusher 80, which may penetrate into card slot 10 through an opening in the wall of the card slot. If first ejection bar assembly 81 is laterally pressed on the opening of the card slot (FIG. 8b), inserted chip cards 23 and/or 24 are ejected. First lever 86 moves out of its rest position 85 and pushes the inserted chip cards into ejection position 87. A spring may be provided, which draws or presses back the ejection bar assembly and the lever into their rest position after ejecting the chip cards, or the ejection mechanism returns to its rest position only when chip cards are introduced again. FIG. 8c shows another lateral view of the card reader with an ejection mechanism 84.

Figure 9:
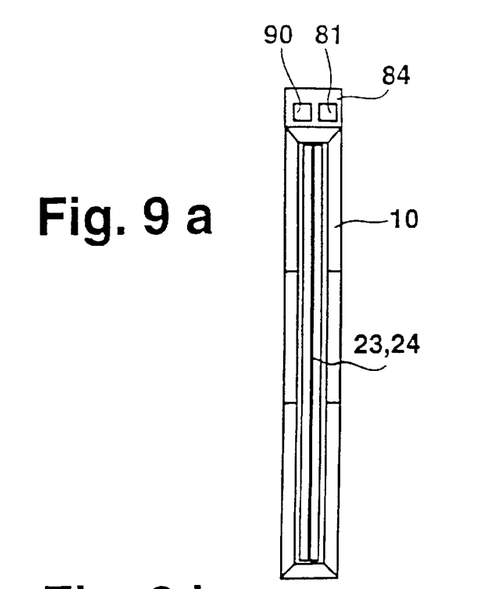
FIG. 9a shows a card reader according to the present invention with an ejection mechanism.
FIG. 9b shows the card reader shown in FIG. 9a with one chip card inserted into the card reader.
FIG. 9c shows the card reader shown in FIG. 9a with two ship cards inserted into the card reader.
FIG. 9d shows the ejection of one chip card from the card reader shown in FIG. 9c.

FIGS. 9a–9b and 10a–10b show another refinement of the card reader according to the present invention. FIG. 9a shows an ejection mechanism 84 with a first ejection bar assembly 81 and a second ejection bar assembly 90 mounted on card slot 10. Two separate ejection bar assemblies allow two chip cards inserted in the card slot to be ejected separately. FIG. 9b shows the card reader with two ejection bar assemblies and one press plate 71 in the state with one chip card inserted; FIG. 9c shows the same card reader with two chip cards inserted. Finally, FIG. 9d shows the example of ejection of first chip card 23, while second chip card 24 remains in the card slot. FIGS. 9b through 9d are overview schematics. The relevant details 100 and 101 for ejection mechanism 84 are illustrated in FIGS. 10a–10b. The contact arrangements and switching arrangements known from the previous figures are not shown in FIGS. 9b through 9d for the sake of simplicity.

Figure 10:
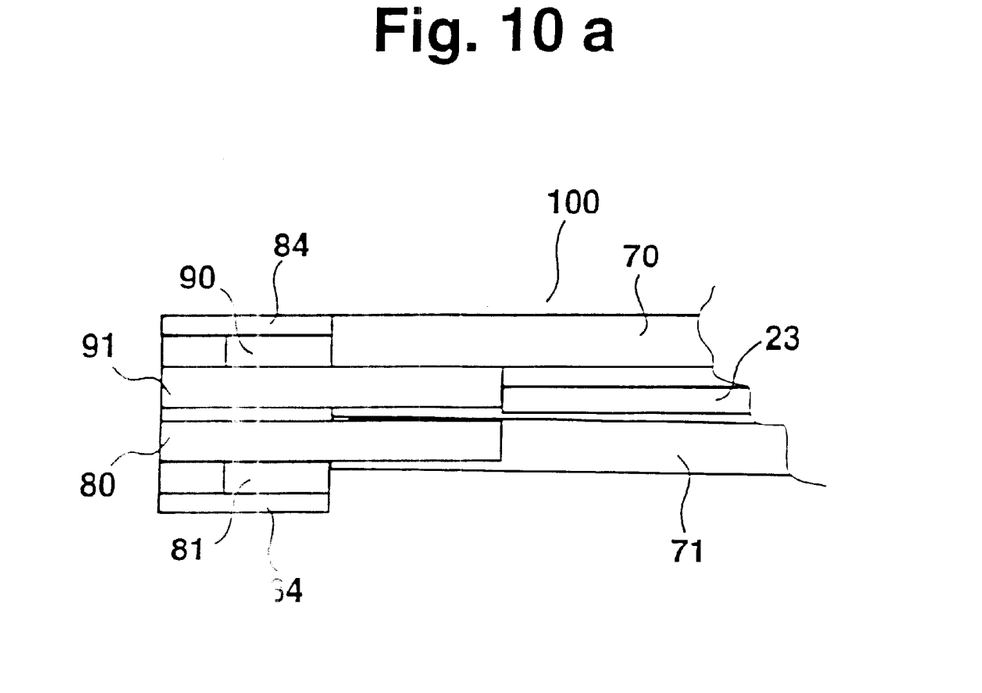
FIG. 10a shows an enlarged section of FIG. 9b.
FIG. 10b shows an enlarged section of FIG. 9d.

FIG. 10a shows detail 100 from FIG. 9b. A chip card 23 is inserted in the card slot. Both first and second ejection pushers 80 and 91 are in their rest positions. Press plate 71 is in an oblique position, since only one chip card has been inserted. Ejection mechanism 84 features, in addition to the ejection pushers, a second ejection bar assembly 90, similar to first bar assembly 81. FIG. 10b shows detail 101 of FIG. 9d. It may be seen that two chip cards 23 and 24 have been inserted in the card slot, the first chip card 23 being in the ejection position. In this lateral view, second lever 92 is visible, unlike in FIG. 10a, where second ejection pusher 91 is in its rest position. The exact positions of the individual components of ejection mechanism 84 depend, of course, on the position of bar assembly mounts 82 and 83 (see FIG. 8), among other things, so that FIG. 10 only illustrates the operation of the ejection mechanism in a qualitative manner. If a means is also provided to guide the ejection mechanism back into its rest position after the ejection of a chip card, it is important that in this case the last chip card in the card slot may only be ejected with second ejection pusher 91, since press plate 71 presses the last chip card onto holding plate 70. Another advantage of a contact arrangement rigidly attached to press plate 71 is that contact with chip card 24 is not interrupted by the ejection sequence of chip card 23, although press plate 71 presses chip card 24 that remains in the card slot against holding plate 70. In order not to cause electrical malfunction when chip cards are inserted or when individual chip cards are ejected, appropriate measures may, of course, be taken using computer 11. For example, contact arrangement 14 and/or contact arrangement 15 may be briefly switched off by actuating switching arrangement 26 and/or 16' or 16. With two switching arrangements, the computer also detects whether it communicates with contact arrangement 14 or second contact arrangement 15. The inactive contact arrangement may then be switched off, so that when a second chip card is inserted, it slides over the deactivated contact arrangement.

Figure 11:
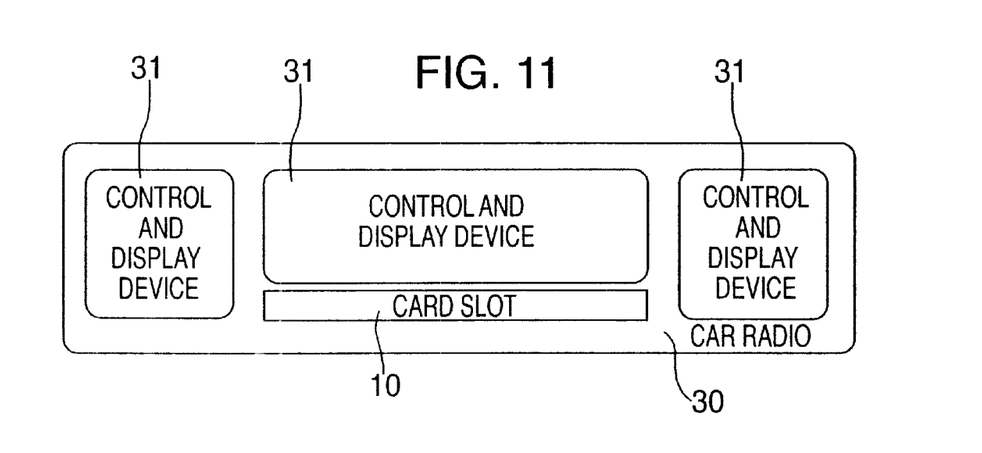
FIG. 11 shows an exemplary embodiment of the present invention.

FIG. 11 shows, as an exemplary embodiment, the integration of the card reader with card slot 10 into a car radio 30. Schematically illustrated are also control and display devices 31 of car radio 30. This car radio has, for example, both a broadcast receiver and the technical devices of a traffic message channel (TMC) decoder and a car phone.

Figure 12:
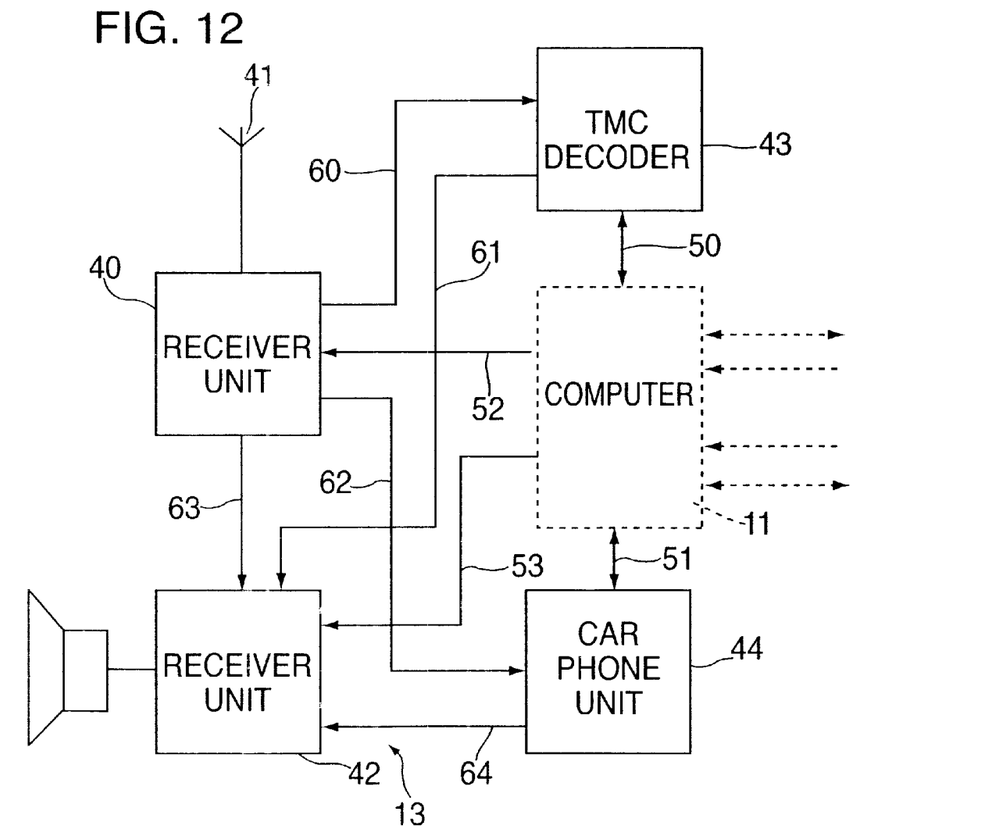
FIG. 12 shows a fourth embodiment of a card reader according to the present invention.

FIG. 12 shows an embodiment with a receiver unit 40 (e.g., a car radio receiver), an antenna 41, an audio amplifier 42, a TMC decoder 43 and a car phone unit 44 as application module 13. These units communicate with computer 11, which is shown with dashed lines, together with the previously described data links. Communication of the above-mentioned components of application module 13 with computer 11 takes place via unidirectional or bidirectional links 50, 51, 52, 53, 60, 61, 62, 63, and 64. The radio, TMC, and car phone signals received are distributed via antenna 41 and tunable receiving unit 40, to the respective components such as audio amplifier 42, TMC decoder 43, and car phone unit 44. Computer 11 controls the system. The audio signals generated by the different components are sent to audio amplifier 42 (voice or music), whose input sources are switchable. This control is also performed by computer 11. If first switching arrangement 16' and/or second switching arrangement 26 are actuated by the insertion or ejection of one or two chip cards, computer 11 registers this status change and performs the required actions such as turning the supply voltage on or off, resetting, and the like. The separate wiring of car phone unit, audio amplifier, etc., with computer 11 allows independent communication of computer 11 with the chip cards introduced.

What is claimed is:

1. A card reader for chip cards, each chip card having a front face with contacts for reading or entering information, comprising:

a card slot for receiving chip cards via an opening;

a first contact arrangement in the card slot for contacting the contacts of a first chip card inserted in the opening of the card slot; and a first switching arrangement responding to one of a presence and absence of chip cards in the card slot, the first switching arrangement including a second contact arrangement opposite the first contact arrangement in the card slot for contacting a second chip card inserted in the opening of the card slot; and a first device placing a single chip card inserted in the opening of the card slot in contact with the first contact arrangement if the contacts of the single chip card face the first contact arrangement, the first device placing the single chip card inserted in the opening of the card slot in contact with the second contact arrangement if the contacts of the single chip card face the second contact arrangement.

2. The card reader according to claim 1, wherein the card slot receives one of one chip card and two chip cards, wherein when the card slot receives the two chip cards, a back face of each of the two chip cards lies flat against one another when the two chip cards are inserted in the card slot.

3. The card reader according to claim 1, further comprising:

a second switching arrangement responding to the presence and absence of the second chip card in the card slot; and a second device allowing an actuation of only the first switching arrangement when the first chip card is inserted in the card slot.

4. The card reader according to claim 3, wherein the second device includes a press plate, the press plate guiding the first chip card to the first switching arrangement.

5. The card reader according to claim 4, wherein the press plate includes a press spring, the press spring being rotatably mounted on the opening of the card slot.

6. The card reader according to claim 4, wherein the second contact arrangement is fastened to the press plate and includes contacts having a displacement such that when the single chip card is inserted in the card slot, the single chip card is contacted even when the press plate is in an inclined position in the card slot.

7. The card reader according to claim 1, further comprising:

a first ejection device for ejecting the first chip card inserted in the card slot.

8. The card reader according to claim 7, further comprising:

a second ejection device, wherein the first ejection device and the second ejection device individually eject the first chip card and the second chip card, respectively.

9. The card reader according to claim 1, wherein the first switching arrangement, second switching arrangement, first contact arrangement, and second contact arrangement include data links coupling the first switching arrangement, second switching arrangement, first contact arrangement, and second contact arrangement to a computer such that inserted chip cards may be at least one of read and written to when at least on of the first switching arrangement and second switching arrangement signals the presence of chip cards.

10. The card reader according to claim 9, wherein when one of the first chip card and the second chip card is inserted in the card slot, a data exchange takes place between the computer and the one of the first chip card and the second chip card via one of the first contact arrangement and the second contact arrangement.

11. The card reader according to claim 1, wherein the card reader is integrated in a car radio and at least one of reads information for a traffic message channel (TMC) decoder, reads information for a car phone unit, and writes information for the car phone unit.

12. The card reader according to claim 1, wherein information is transmitted by at least one of the first contact arrangement to the second contact arrangement and the second contact arrangement to the first contact arrangement.

* * * * *